(12) United States Patent
Schnoor

(10) Patent No.: US 6,901,737 B2
(45) Date of Patent: Jun. 7, 2005

(54) AIR INTAKE FOR AN AUXILIARY POWER UNIT IN AN AIRCRAFT

(75) Inventor: Martin Schnoor, Kaltenkirchen (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 10/338,218

(22) Filed: Jan. 7, 2003

(65) Prior Publication Data

US 2003/0183272 A1 Oct. 2, 2003

(30) Foreign Application Priority Data

Jan. 9, 2002 (DE) ......................................... 102 00 459

(51) Int. Cl.$^7$ ................................................. F02C 7/12
(52) U.S. Cl. ..................... 60/39.83; 60/269; 244/53 B; 244/58
(58) Field of Search ................................ 60/39.83, 269, 60/39.091, 39.092; 244/53 B, 58

(56) References Cited

U.S. PATENT DOCUMENTS

| | | | |
|---|---|---|---|
| 3,667,703 A | * 6/1972 | Boek ......................... | 244/53 B |
| 4,174,083 A | 11/1979 | Mohn | |
| 4,307,743 A | * 12/1981 | Dunn .......................... | 137/15.1 |
| 4,397,431 A | * 8/1983 | Ben-Porat .................. | 244/53 B |
| 4,418,879 A | 12/1983 | Vanderleest | |
| 4,425,756 A | * 1/1984 | Ballard et al. ............ | 60/39.092 |
| 4,456,458 A | * 6/1984 | Gilbertson ................. | 55/306 |
| 4,655,413 A | 4/1987 | Genssler et al. | |
| 4,775,341 A | 10/1988 | Tyler et al. | |
| 4,999,994 A | 3/1991 | Rud et al. | |
| 5,265,408 A | 11/1993 | Sheoran et al. | |
| 5,284,012 A | 2/1994 | Laborie et al. | |
| 5,655,359 A | 8/1997 | Campbell et al. | |
| 5,987,877 A | 11/1999 | Steiner | |
| 6,092,360 A | 7/2000 | Hoag et al. | |
| 6,293,494 B1 | 9/2001 | Scherer et al. | |
| 6,390,414 B1 | * 5/2002 | Medvedev ................ | 244/53 B |

FOREIGN PATENT DOCUMENTS

| | | |
|---|---|---|
| DE | 3407137 | 8/1985 |
| DE | 19619535 | 10/1997 |

OTHER PUBLICATIONS

"Ejector Oil Cooling System for an Auxiliary Engine of an Aircraft", by Andreas Winter et al., U.S. Appl. No. 08/856,910; filed May 15, 1997, pp. 1 to 18 and 2 sheets of drawings.

* cited by examiner

Primary Examiner—Cheryl Tyler
Assistant Examiner—William H. Rodriguez
(74) Attorney, Agent, or Firm—W. F. Fasse; W. G. Fasse

(57) ABSTRACT

An air intake for an aircraft forms a first airflow channel (8) for feeding fresh air into the aircraft, and a second airflow channel (2) for feeding cooling air to an auxiliary power unit (AP). These first and second airflow channels are so positioned relative to each other that respective channel inlets or flow cross-sectional areas can be opened and closed by a single seesaw rocker (4) which is journaled or hinged between its ends to the aircraft body in such a position that one end (4A) of the seesaw rocker (4) can close the first channel (2) while the other rocker end (4B) simultaneously closes the second channel (8). The seesaw rocker (4) is driven by a motor responsive to the operation of the auxiliary power unit. When the auxiliary power unit operates, both channels (2, 8) are open. When the auxiliary power unit does not operate both channels (2, 8) are closed.

12 Claims, 1 Drawing Sheet

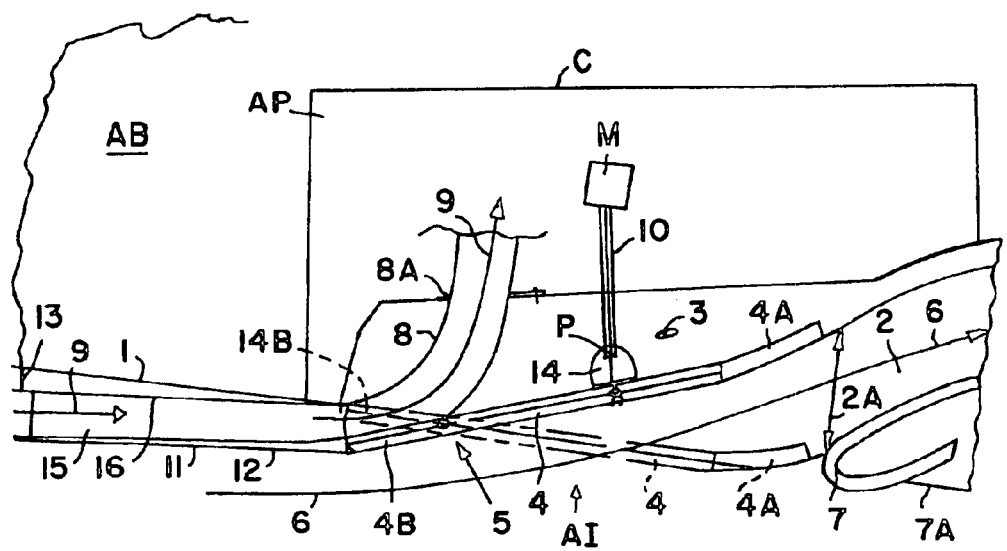
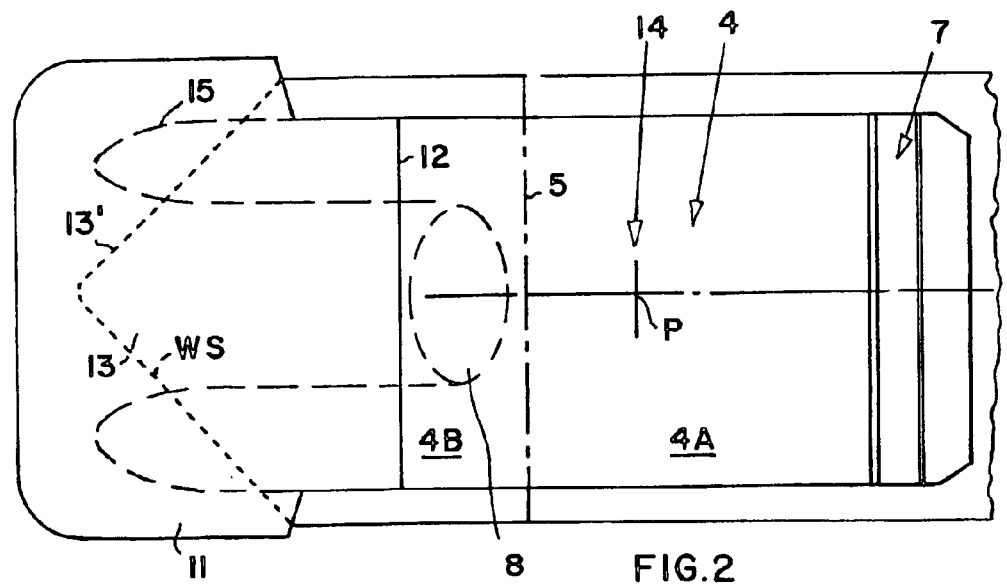

AIR INTAKE FOR AN AUXILIARY POWER UNIT IN AN AIRCRAFT

PRIORITY CLAIM

This application is based on and claims the priority under 35 U.S.C. §119 of German Patent Application 102 00 459.5, filed on Jan. 9, 2002, the entire disclosure of which is incorporated herein by reference.

FIELD OF THE INVENTION

The invention relates to an air intake for an aircraft, particularly for supplying cooling air to an auxiliary power unit of the aircraft and for supplying useful air into the aircraft.

BACKGROUND INFORMATION

Auxiliary power units are mounted in a chamber within the aircraft body for supplying electricity to auxiliary aircraft components. Preferably, such auxiliary power unit is operating only intermittently. Separate air inlet openings are conventionally provided for introducing useful or fresh air into the aircraft and for supplying cooling air to the auxiliary power unit. These inlet openings or air intakes pass through the skin of the aircraft body. Separate flaps are movably secured to the aircraft body for closing the air inlet opening for the airflow of the useful or fresh air into the aircraft body and for closing the air inlet opening for the cooling airflow to the auxiliary power unit. The separate flaps are controlled in such a manner that both air inlet openings are open when the auxiliary power unit is operating and so that both openings are closed when the auxiliary power unit is not operating.

German Patent Publication DE 34 07 137 corresponding to U.S. Pat. No. 4,655,413 (Genasler et al.) discloses an air intake as described above for an auxiliary power unit, see particularly FIGS. 8 and 9. An auxiliary power unit is, for example, installed in the tail end of a commercial aircraft. Normally, such a unit operates intermittently. Therefore, the air inlets or air intakes are closeable by flaps which in their closed condition are flush with the outer skin of the aircraft body. In order to improve the flow conditions along the outer skin of the aircraft body a boundary layer deflector is provided in the flow direction upstream of the air inlet. Such boundary layer deflector is constructed and mounted to be movable relative to the aircraft body. The boundary layer deflector is positioned or operated in such a manner in response to the respective position of the air intake flap or flaps that when the air intake is open the boundary layer deflector is positioned outside of the aircraft body in its operating position. On the other hand, when the air intake is closed the boundary layer deflector is positioned within the outer contour of the aircraft body.

The above described conventional air intake construction leaves room for improvement particularly with regard to simplifying the construction and reducing the number of components required for performing the above outlined task.

OBJECTS OF THE INVENTION

In view of the foregoing it is the aim of the invention to achieve the following objects singly or in combination:

to simplify an air intake of the type described above in such a manner that a single closure member is capable of closing both air intake inlets simultaneously while being capable of assuring a sufficient supply of cooling air to the auxiliary power unit as well as useful or fresh air into the aircraft, regardless whether the aircraft is in flight or on the ground;

to construct the closure device in such a way that an existing air inlet opening for an auxiliary power unit does not have to be changed so that retro-fitting with the present closure device is possible; and to assure a sufficient supply of cooling air to the auxiliary power unit by increasing during flight the pressure head at the cooling air inlet opening.

SUMMARY OF THE INVENTION

According tho the invention there is provided an air intake for an aircraft wherein the air inlet opening serves simultaneously for supplying useful or fresh air into the aircraft and for supplying additional cooling air to the auxiliary power unit. For this purpose, a mechanical seesaw rocker flap is mounted by a hinge, preferably below the air intake opening. A drive motor operates the seesaw rocker flap in such a way that when the auxiliary power unit is switched off, the air inlet opening for the cooling air is closed by one end of the seesaw rocker flap, while the air inlet opening for the fresh air or useful air is simultaneously closed by the other end of the seesaw rocker flap. This "flap" will be referred to herein simply as seesaw rocker.

It is an advantage of the invention that an existing configuration of the air intake opening for an auxiliary power unit does not have to be modified. Further, an air separation member such as an aerodynamically shaped piece of sheet metal or the like that separates the airflow into a cooling air portion and a fresh air portion forms a free space below the air separation member, whereby the air resistance or drag on the aircraft outer skin is advantageously reduced when the seesaw rocker is closed. Another advantage is seen that during flight the pressure head is increased in the area of the cooling air inlet opening, whereby the cooling efficiency is increased. As a result, the cooling system for the auxiliary power unit can be smaller than is conventionally possible.

BRIEF DESCRIPTION OF THE DRAWINGS

In order that the invention may be clearly understood, it will now be described in connection with example embodiments, with reference to the accompanying drawings, wherein:

FIG. 1 illustrates a broken-away longitudinal section through an aircraft outer skin in the area of the air intake opening for fresh air for the aircraft and for cooling air for the auxiliary power unit; and FIG. 2 is a schematic view in the direction of the arrow II in FIG. 1.

DETAILED DESCRIPTION OF A PREFERRED EXAMPLE EMBODIMENT AND OF THE BEST MODE OF THE INVENTION

FIG. 1 shows schematically an aircraft body AB having an outer skin 1 that encloses the aircraft body AB and a mounting chamber C for an auxiliary power unit AP mounted in the chamber C. A three-dimensional recess 3 is formed in the aircraft outer body wall or skin 1 to form an air intake AI. Air guide elements divide the airflow along the aircraft body from left to right, as seen by the viewer, into two partial airflows. More specifically a first airflow inlet channel 2 is formed by guide elements including an air intake rim 7 for gathering air into the inlet channel 2 to feed a partial airflow 6 as useful or fresh air into the aircraft body AB. The air intake rim 7 is secured to the aircraft body wall 7A. Additional air guide elements including an air separation member 11 having a downstream end 12 form a second airflow channel 8 for diverting a cooling airflow 9 into the chamber C for cooling the auxiliary power unit AP.

According to the invention a seesaw rocker 4 is mounted in the recess 3 on a hinging axis 5. The seesaw rocker 4 has a downstream end 4A as viewed in the airflow direction and an upstream end 4B. In the full line position of the seesaw rocker 4 the inlets to both airflow channels 2 and 8 are open. In the dashed line position of the seesaw rocker 4 both inlets to the airflow channels 2 and 8 are closed. Incidently, the inlet formed by the rim 7 for the first airflow channel 2 has, for example, a circular cross section 2A. The seesaw rocker 4 serves as a device for opening both inlets simultaneously as shown in full lines and for also simultaneously closing both inlets as shown in dashed lines. For this purpose the seesaw rocker 4 is controlled in its movement by a motor M that is linked to the downstream end 4A of the seesaw rocker 4 by a linkage 10 pivoted at P to a connecting bracket 14 that is secured to the backside of the seesaw rocker end 4A. The motor M is responsive in its operation to whether the auxiliary power unit AP is switched on or switched off. Due to the position of the hinging axis 5, the see saw rocker 4 can be easily moved between the full line open position and the dashed line closed position. The cooling airflow 9, separated by the air separation member 11, is guided into the channel 8 which passes through an opening 8A in the outer skin 1 and into the chamber C. The cooling air 9 may flow either directly into the chamber C or it may flow into a pipe, not shown, that leads into the chamber C for cooling the auxiliary power unit AP.

The axis of the hinge 5 of the seesaw rocker 4 is mounted below the air inlet opening 8A, whereby the rocker 4 driven by the motor M can be controlled through the linkage 10 in such a way that when the auxiliary power unit AP is switched off, the end 4A of the rocker 4 closes the air inlet channel 2, while the rocker end 4B reaching upstream of the axis of the hinge 5 closes the air inlet channel 8. For this purpose the drive linkage 10 is arranged or rather pivoted at a point P to the seesaw rocker 4. The pivot P is positioned between the axis of the hinge 5 and the downstream edge of the end 4A of the seesaw rocker 4. Preferably, the pivot P is positioned in a mounting bracket 14, as mentioned.

Referring further to FIGS. 1 and 2, the above mentioned air separation member 11 is positioned so as to divide the entire airstream into two separate streams or flows, namely the fresh airflow 6 in the channel 2 and the cooling airflow 9 in the channel 8, whereby the downstream end 12 of the air separator 11, such as a sheet metal member, aligns with the upstream end 4B or rather with the upstream edge of the upstream end 4B of the seesaw rocker 4 in the open position as seen in FIG. 1. The air separator 11 has a shape conformed to the outer configuration of the outer aircraft skin 1. The air separation member 11 is mechanically secured to the outer skin 1, preferably by at least one aerodynamically shaped support member 15. Due to the positioning of the air separation member 11 relative to the seesaw rocker 4, these components participate in forming the two airflow channels 2 and 8, best seen in FIG. 1 and the full line position. As mentioned, the airflow 6 flows into the aircraft body AB and the airflow 9 flows into the chamber C for cooling the auxiliary power unit AP. When the auxiliary power unit AP is switched off, the end portion 4B of the seesaw rocker 4 rests against the aircraft outer skin 1 to provide an aerodynamically efficient, advantageous flow condition on the aircraft body surface as shown by the dashed line position of the seesaw rocker 4 in FIG. 1. In this case the air flows past the air separation member 11 along the closed aircraft outer skin 1. Compared to the open full line position of the seesaw rocker 4, in the closed position the surface area exposed to the external airstream has been reduced to about 50% of the surface area when both airflow channels are open, whereby the drag is correspondingly reduced.

In order to separate liquid that may be present on the surface of the aircraft outer skin 1, a liquid separator 13 is installed between the outer skin 1 and the air separation member 11. The liquid separator 13 is formed as a guide vane, preferably of sheet metal, which is preferably positioned perpendicularly or at a right angle relative to the air separation member 11. The liquid separator 13 reaches partially into the cooling airstream 9 and is secured to the outer skin 1 of the aircraft. As shown in FIG. 2, the liquid separator 13 has a wedge shape WS. The tip 13 of the wedge shape WS points toward the airflow direction, that is, opposite to the airflow direction.

In order to support the air separation member 11, two support pillars 15 are installed as shown in FIG. 1. These supports 15 are fixed on the outer skin 1 and on the liquid separator member 16. The liquid separator member 16 divides the fluid on the outer skin 1 from the cooling airstream 9.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An air intake for an aircraft including an auxiliary power unit housed in a chamber of an aircraft body having an outer skin and an opening in said outer skin for feeding external air through said opening into said aircraft, said air intake comprising a first airflow channel (2) passing through said opening for feeding fresh air into said aircraft, a second airflow channel (8) passing through said opening for feeding cooling air to said auxiliary power unit, a seesaw rocker (4) for simultaneously closing or opening first and second air inlets of said first and second airflow channels (2, 8) respectively, a hinge (5) positioned between first and second rigidly interconnected end portions (4A, 4B) of said seesaw rocker (4), said hinge (5) securing said seesaw rocker (4) to said aircraft body in a position permitting said simultaneous closing or opening of both said first and second air inlets of said first and second airflow channels (2, 8), said air intake further comprising a drive motor (M) operatively connected to said seesaw rocker (4) at a pivot (P) for rocking said seesaw rocker (4) between an airflow channel closing position and an airflow channel opening position, whereby said first and second air flow channels (2, 8) are opened and closed by the same see-saw rocker (4) and wherein said drive motor (M) is responsive to an operational status of said auxiliary power unit (AP) for closing said first and second airflow channels (2, 8) when said auxiliary power unit is not operating and for opening said first and second airflow channels (2, 8) when said auxiliary power unit is operating.

2. The air intake of claim 1, further comprising a drive link (10) connecting said drive motor (M) to said seesaw rocker (4) at said pivot (P) securing one end of said drive link (10) to said seesaw rocker member (4) at a point between said hinge (5) and a downstream edge of said first end portion (4A) of said seesaw rocker (4).

3. The air intake of claim 1, further comprising a stationary air separation member (11) rigidly secured outside to said aircraft body (1) upstream of both said first and second air inlets of said first and second airflow channels (2, 8) as viewed in a direction of air flowing along said aircraft body, said stationary air separation member (11) having a downstream end (12) positioned for cooperation with said second end portion (4B) of said seesaw rocker (4) when said see-saw rocker (4) is in an open position to form a first fresh airstream (6) and to guide said first fresh airstream (6) into said first airflow channel (2), said stationary air separation member (11) further forming a second cooling airstream (9) guided into said second airflow channel (8) when said auxiliary power unit is operating.

4. The air intake of claim 3, further comprising at least one support member (15) having an aerodynamic configuration, said at least one support member (15) rigidly securing said air separation member (11) to said aircraft body.

5. The air intake of claim 3, further comprising a liquid separator (13) positioned between said aircraft outer skin (1) and said air separation member (11), said liquid separator (13) extending toward said air separation member (11) from said aircraft outer skin (1) and reaching partially into said second cooling airstream (9).

6. The air intake of claim 5, wherein said liquid separator (13) extends at a right angle relative to said air separation member (11).

7. The air intake of claim 5, wherein said liquid separator (13) has a shape of a guide vane having a wedge shape (WS) facing with a tapering end of said wedge shape opposite to a flow direction of said second cooling airstream (9).

8. The air intake of claim 1, further comprising an inlet coupling in a wall of said chamber and an airflow channel extension connected to said inlet coupling for feeding said cooling air directly into said chamber wherein said auxiliary power unit is housed.

9. The air intake of claim 1, further comprising a coupling and a pipe leading into said chamber wherein said auxiliary power unit is housed, said coupling connecting said pipe to said second air flow channel (8) for feeding cooling air to said auxiliary power unit.

10. The air intake of claim 1, wherein said hinge (5) of said seesaw rocker (4) is located below said second airflow channel (8) and upstream of said first airflow channel (2).

11. An air intake for an aircraft including an auxiliary power unit housed in a chamber of an aircraft body having an outer skin and an opening in said outer skin for feeding external air through said opening into said aircraft, said air intake comprising a first airflow channel (2) passing through said opening for feeding fresh air into said aircraft, a second airflow channel (8) passing through said opening for feeding cooling air to said auxiliary power unit, a seesaw rocker (4) for simultaneously closing or opening first and second air inlets of said first and second airflow channels (2, 8) respectively, a hinge (5) positioned between first and second rigidly interconnected end portions (4A, 4B) of said seesaw rocker (4), said hinge (5) securing said seesaw rocker (4) to said aircraft body in a position permitting said simultaneous closing or opening of both said air inlets of said first and second airflow channels (2, 8), said air intake further comprising a drive motor (M) operatively connected to said seesaw rocker (4) at a pivot (P) for rocking said seesaw rocker (4) between an airflow channel closing position and an airflow channel opening position, whereby said first and second air flow channels (2, 8) are opened and closed by the same see-saw rocker (4) and wherein said drive motor (M) is responsive to an operational status of said auxiliary power unit (AP) for closing said first and second airflow channels (2, 8) when said auxiliary power unit is not operating and for opening said first and second airflow channels (2, 8) when said auxiliary power unit is operating, said air intake further comprising a stationary air separation member (11) rigidly secured outside to said aircraft body (1) upstream of both said first and second air inlets of said first and second airflow channels (2, 8) as viewed in a direction of air flowing along said aircraft body, said stationary air separation member (11) having a downstream end (12) positioned for cooperation with said second end portion (4B) of said seesaw rocker (4) when said see-saw rocker (4) is in an open position to form a first fresh airstream (6) and to guide said first fresh airstream (6) into said first airflow channel (2), said stationary air separation member (11) further forming a second cooling airstream (9) guided into said second airflow channel (8) when said auxiliary power unit is operating.

12. An air intake for an aircraft including an auxiliary power unit housed in a chamber of an aircraft body having an outer skin and an opening in said outer skin for feeding external air through said opening into said aircraft, said air intake comprising a first airflow channel (2) passing through said opening for feeding fresh air into said aircraft, a second airflow channel (8) passing through said opening for feeding cooling air to said auxiliary power unit, a seesaw rocker (4) for simultaneously closing or opening first and second air inlets of said first and second airflow channels (2, 8) respectively, a hinge (5) positioned between first and second rigidly interconnected end portions (4A, 4B) of said seesaw rocker (4), said hinge (5) securing said seesaw rocker (4) to said aircraft body in a position permitting said simultaneous closing or opening of both said air inlets of said first and second airflow channels (2, 8), said air intake further comprising a drive motor (M) operatively connected to said seesaw rocker (4) at a pivot (P) for rocking said seesaw rocker (4) between an airflow channel closing position and an airflow channel opening position, whereby said first and second air flow channels (2, 8) are opened and closed by the same see-saw rocker (4) and wherein said drive motor (M) is responsive to an operational status of said auxiliary power unit (AP) for closing said first and second airflow channels (2, 8) when said auxiliary power unit is not operating and for opening said first and second airflow channels (2, 8) when said auxiliary power unit is operating, said air intake further comprising a liquid separator (13) positioned between said aircraft outer skin (1) and an air separation member (11) spaced from said outer skin, said liquid separator (13) extending toward said air separation member (11) from said aircraft outer skin (1) and reaching partially into said second cooling airstream (9).

\* \* \* \* \*